(12) United States Patent
Halgrin et al.

(10) Patent No.: US 12,728,813 B2
(45) Date of Patent: Sep. 8, 2026

(54) CATCH STRAP MECHANISM FOR AN AIRBAG MODULE

(71) Applicant: Autoliv Development AB, Vargarda (DE)

(72) Inventors: Julien Halgrin, Doudeauville en Vexin (FR); Christophe Gros, Poitiers (FR); Thierry Jacqmarcq, Cuigy en Bray (FR); Frederic Charpentier, Le Vauroux (FR); Marc Marchand, Le Vaumain (FR); Laurent Hellot, La Feuillie (FR); Carole Gaillhard, Gournay en Bray (FR); Laurent Lengaigne, La Chaussée (FR); Matthieu Louvet, Lyons la Foret (FR)

(73) Assignee: Autoliv Development AB, Vargarda (SE)

( * ) Notice: Subject to any disclaimer, the term of this patent is extended or adjusted under 35 U.S.C. 154(b) by 8 days.

(21) Appl. No.: 18/848,461

(22) PCT Filed: Feb. 7, 2023

(86) PCT No.: PCT/EP2023/052984
§ 371 (c)(1),
(2) Date: May 22, 2025

(87) PCT Pub. No.: WO2023/179956
PCT Pub. Date: Sep. 28, 2023

(65) Prior Publication Data

US 2025/0276665 A1 Sep. 4, 2025

(30) Foreign Application Priority Data

Mar. 23, 2022 (DE) .................... 10 2022 106 750.5

(51) Int. Cl.
*B60R 21/2338* (2011.01)
*B60R 21/207* (2006.01)

(52) U.S. Cl.
CPC ........ *B60R 21/2338* (2013.01); *B60R 21/207* (2013.01)

(58) Field of Classification Search
CPC .............. B60R 21/2338; B60R 21/207; B60R 2021/23388
See application file for complete search history.

(56) References Cited

U.S. PATENT DOCUMENTS 10,730,475 B2 * 8/2020 Hayashi .............. B60R 22/1952
11,938,887 B2 * 3/2024 Saito ..................... B60R 21/207
12,109,966 B2 * 10/2024 Söhnchen ............ B60R 21/207
2019/0106081 A1 4/2019 Hayashi et al.
2019/0248322 A1 8/2019 Herzenstiel et al.
(Continued)

FOREIGN PATENT DOCUMENTS

DE 10239437 A1 3/2004
DE 102014004185 A1 9/2015
(Continued)

*Primary Examiner* — Jason D Shanske
*Assistant Examiner* — Joselynn Y Sliteris
(74) *Attorney, Agent, or Firm* — Foley & Lardner LLP

(57) ABSTRACT

A catch strap mechanism for an airbag module having an airbag, comprising at least one catch strap arrangement, wherein one end of a catch strap arrangement can be attached to the airbag, and a tightening device for the catch strap arrangement.

9 Claims, 3 Drawing Sheets

(56) References Cited

U.S. PATENT DOCUMENTS

| | | | |
|---|---|---|---|
| 2020/0406855 | A1 | 12/2020 | Saito et al. |
| 2023/0356684 | A1 | 11/2023 | Söhnchen et al. |

FOREIGN PATENT DOCUMENTS

| | | | |
|---|---|---|---|
| DE | 102020101051 | A1 | 7/2021 |
| DE | 10 2020 125 236 | A1 | 3/2022 |
| EP | 3718833 | A1 | 10/2020 |
| JP | S49125429 | U | 10/1974 |

* cited by examiner

CATCH STRAP MECHANISM FOR AN AIRBAG MODULE

DESCRIPTION

The present invention relates to a catch strap mechanism for an airbag module having an airbag, comprising at least one catch strap arrangement, wherein one end of a catch strap arrangement can be attached to the airbag, and a tightening device for the catch strap arrangement.

Such a catch strap mechanism can in particular be a component of an airbag device for a vehicle seat which comprises at least one airbag module having an airbag and which is suitable for installation in the vehicle seat. In this case, one end of the catch strap arrangement is attached to the airbag. The present invention also relates to a vehicle seat for a motor vehicle, comprising a backrest, a seat cushion and an airbag device of this kind.

Such a vehicle seat with such a catch strap mechanism is known, for example, from US 2019/0248322 A1. The airbag, which is arranged in particular in a lateral region of a backrest in the initial state, unfolds after it is triggered next to and/or in front of a passenger sitting on the vehicle seat. It can be provided that the catch strap arrangement guides the unfolding process at least temporarily during the unfolding of the airbag, for example when the catch strap arrangement is in a tensioned state. It is also conceivable that the catch strap arrangement is unwound from a spool during unfolding or is tensioned from a wound or folded state by the unfolding airbag.

The tightening device is provided to retract the catch strap arrangement during unfolding or at the end of the unfolding process and therefore to influence the unfolding process or to bring the airbag into a final position after unfolding. For example, a portion of the airbag located in front of the passenger after unfolding can be pulled towards the backrest by the tightening device so that the passenger is also pulled towards the backrest. From US 2019/0248322 A1, for example, it is known to wind up the catch strap arrangement by means of the tightening device through a rotary movement.

The object of the present invention is to provide an alternative to how the catch strap arrangement can be tightened.

A solution to the object is specified in independent claim 1, wherein further solutions and advantageous developments are specified in the preceding and following description, wherein individual features of the advantageous developments can be combined with one another in a technically reasonable manner.

The object is achieved in particular by a catch strap mechanism with the features mentioned at the outset, in which the tightening device comprises a tightening element that can be accelerated in a straight line and which can be accelerated in particular by means of a pyrotechnic drive.

The tightening device can, for example, comprise a tensioner tube in which a piston is arranged. For example, a gas generator can be used to introduce compressed gas into the tensioner tube, which drives the piston through the tensioner tube. The tightening element is in particular connected, for example, by means of a rigid rod or by means of a tension cable to the tightening element, which is arranged outside the tensioner tube.

In this context, it can be provided in particular that a deflection block, in particular designed as a single piece, is attached to the tensioner tube, through which the tension cable is guided. Preferably, a receptacle is formed in the deflection block in which the gas generator is arranged. Such an arrangement has in particular the advantage that the tensioner tube can extend obliquely to the linear direction of movement of the tightening element connected to the piston via the tension cable in a mounted state. It is therefore possible, for example, for the tensioner tube to extend in the longitudinal direction of the vehicle when the vehicle seat is in the mounted state in the usual manner in a motor vehicle, while the rectilinear direction of movement of the tightening element extends transversely thereto.

Each catch strap arrangement can be made from a single catch strap or catch cord which is made in particular from a taught fabric. The catch strap arrangement can however also be made of a plurality of catch straps/catch cords connected to each other.

The tightening device is coupled to the catch strap arrangement via the tightening element in such a way that the catch strap arrangement is deflected by the tightening element at least before, after and/or during the tightening process. The portions arranged in front of and behind the tightening element in the catch strap running direction are therefore arranged at an angle to each other. For example, the catch strap arrangement can be deflected by the tightening element by more than 60°, preferably more than 90° or about 180°. The degree of deflection can be constant during the tightening process, but can also change during the tightening process.

The catch strap arrangement and the tightening element which can be accelerated in a straight line are in particular arranged relative to each other in such a way that a type of pulley is formed. The tightening element which can be accelerated in a straight line and the catch strap arrangement are arranged in particular in such a way that the end of the catch strap arrangement attached to the airbag covers a greater distance during the tightening process than the linearly accelerating tightening element. For this purpose, the catch strap mechanism can comprise one or more deflectors for the catch strap arrangement.

The invention further provides that two catch strap arrangements are provided, both of which are deflected by the one tightening element. It can be provided that both catch strap arrangements can be or are attached at different locations on the same airbag. However, it is preferred that both catch strap arrangements are attached with their ends to two airbags, in particular to different airbag modules. It is therefore possible to tighten two airbags with just one tightening device, so that the amount of equipment for tightening two airbags is reduced.

In one embodiment, it can be provided that the catch strap mechanism comprises a holder with which the ends of the catch strap arrangements that cannot be attached to the airbag are fixed. Depending on the arrangement of additional deflectors, it can therefore be achieved that the tightening path of the catch strap arrangements covered by the ends which can be attached to the airbag is more than 1.5 times, preferably 2 times or more than 2 times the distance covered by the tightening element.

In a further embodiment, it can be provided that the ends of the catch strap arrangements that are not to be attached to the airbags are fixed to the tightening element itself, wherein the catch strap arrangements are guided around a deflector between the other ends (fixed to the tightening element) and the portions deflected by the tightening element. The catch strap arrangements therefore extend from the tightening element through the deflector and back to the tightening element where they are deflected again. In this way, it is possible for the tightening path covered by the ends which can be attached to the airbag to be double or even more than double the tightening path covered by the tightening element.

The invention and the technical environment are explained below by way of example with reference to the figures. Schematically, in the figures.

Figures 1, 2:
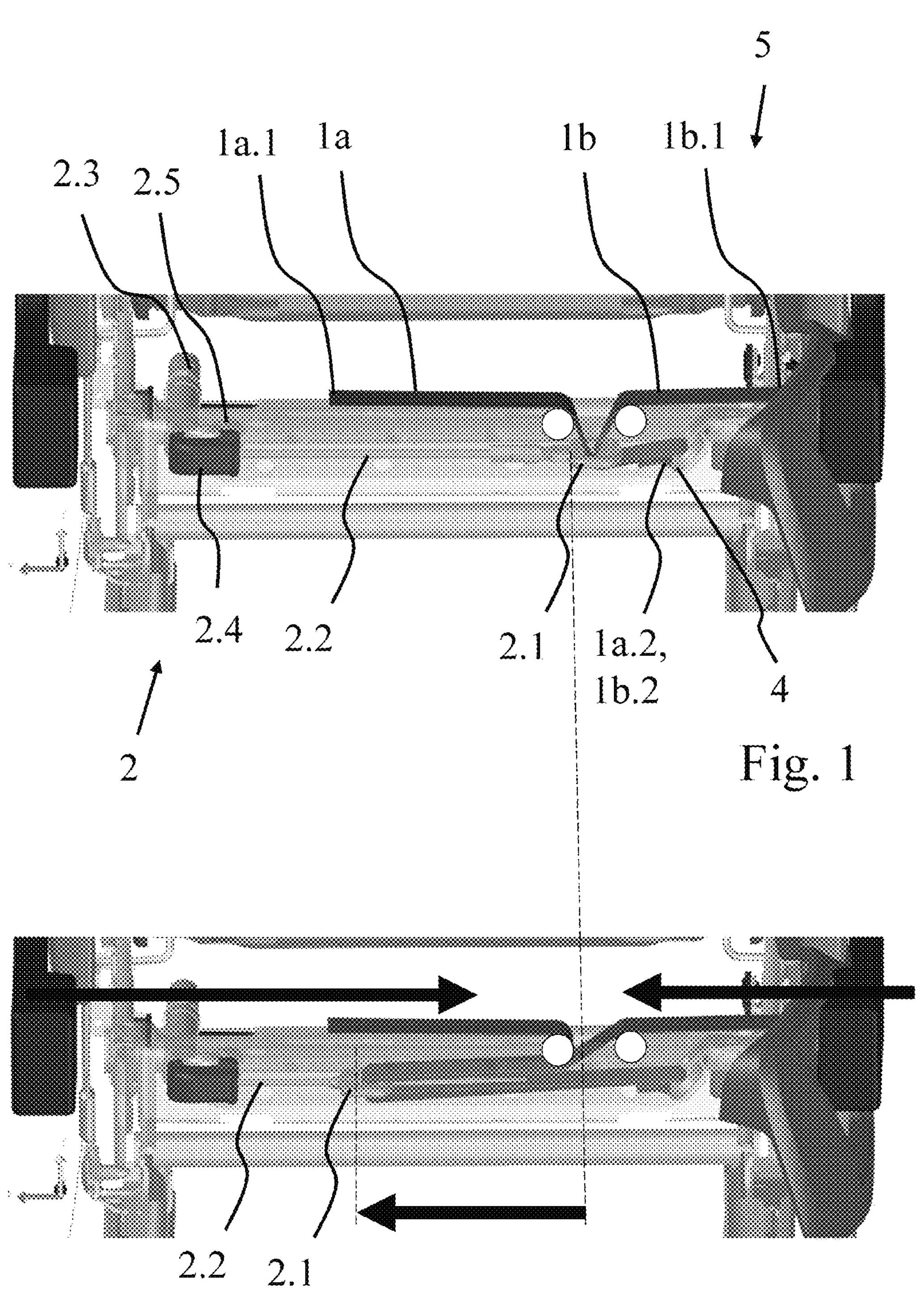
FIG. 1 is a perspective view of a vehicle seat with a catch strap mechanism for an airbag device in an initial state.
FIG. 2 shows the catch strap mechanism during a tightening process.

The figures show a catch strap mechanism in a vehicle seat 5. The catch strap mechanism comprises a first catch strap arrangement 1*a* which can be attached to an airbag by a first end 1*a*.1. The catch strap mechanism comprises a second catch strap arrangement 1*b*, which can be attached to another airbag by a first end 1*b*.1.

The catch strap mechanism also comprises a tightening device 2, which comprises a tensioner tube 2.3 extending in the longitudinal direction of a vehicle, to which a deflection block 2.4 is connected. The deflection block 2.4 has a receptacle 2.5 for a gas generator.

A piston (not visible in the figures) is arranged in the tensioner tube 2.3 and is connected to a tension cable 2.2. The tension cable 2.2 is led out of the tensioner tube 2.3 through the deflection block 2.4.

A tightening element 2.1 is attached to the tension cable 2.2, which deflects the catch strap arrangements 1*a* and 1*b*.

In the embodiment shown in FIGS. 1 and 2, both catch strap arrangements 1*a* and 1*b* are fixed to a holder 4 by their second ends 1*a*.2 and 1*b*.2.

If the tightening device is triggered, the piston arranged in the tensioner tube 2.3 is driven in the longitudinal direction of the vehicle so that the tightening element 2.1 in FIGS. 1 and 2 is accelerated in a straight line to the left. This movement of the tightening element 2.1 causes the ends 1*a*.1 and 1*b*.1 attached to the airbag to be retracted so that the airbag (not shown) is aligned after or during its unfolding. Since a type of pulley is formed by the deflection of the catch strap arrangements 1*a* and 1*b* by means of the tightening element 2.1, the tightening path covered by the ends 1*a*.1 and 1*b*.1 is greater than the tightening path covered by the tightening element 2.1.

Figures 3, 4:
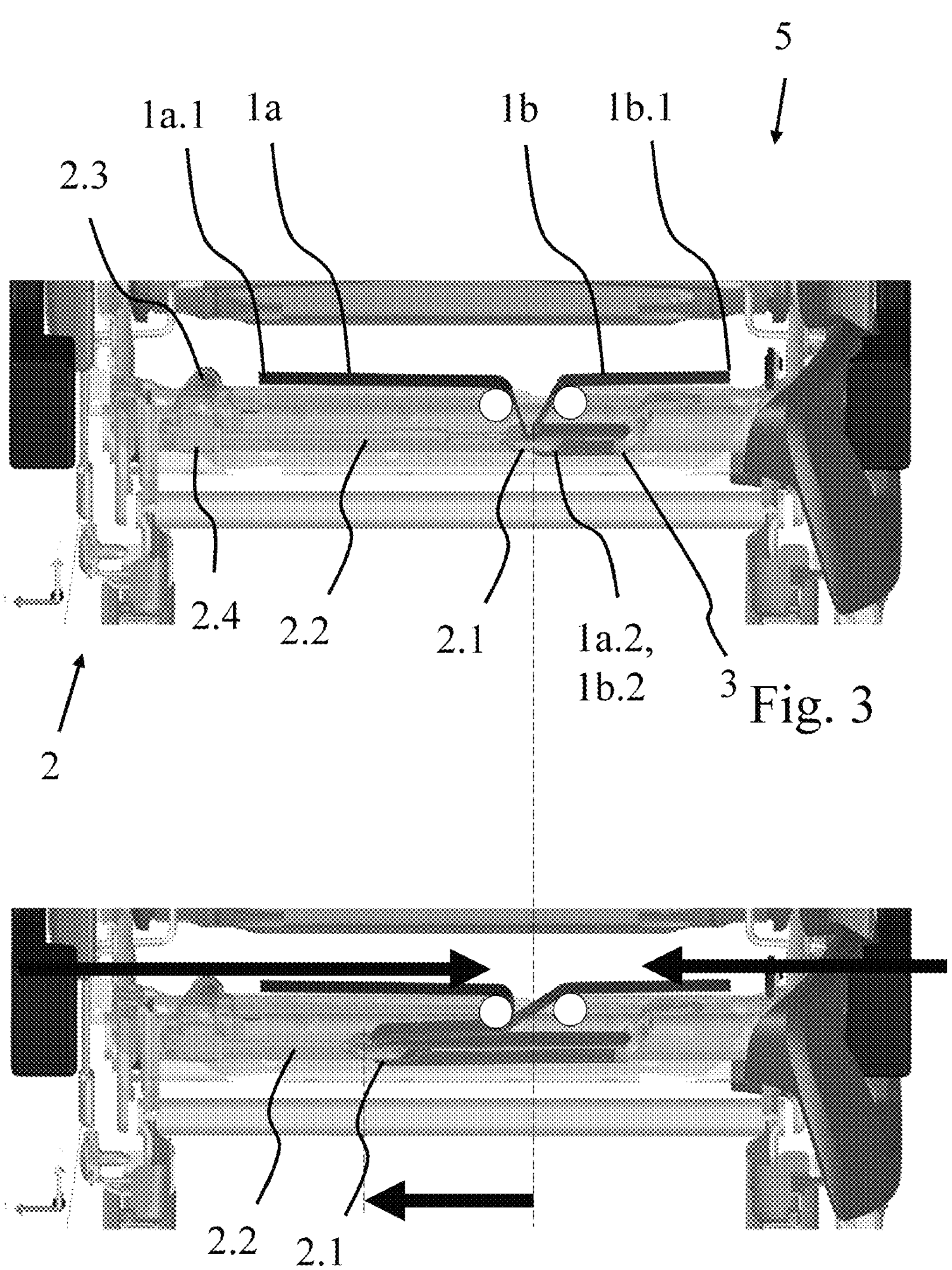
FIG. 3 shows a second embodiment of a catch strap mechanism in a vehicle seat in an initial state.
FIG. 4 shows the catch strap mechanism according to FIG. 3 during a tightening process.

In the embodiment shown in FIGS. 3 and 4, the ends 1*a*.2 and 1*b*.2 of the catch strap arrangements 1*a* and 1*b* are fixed to the tightening element 2.1. Both catch strap arrangements 1*a* and 1*b* are then deflected around a deflector 3 and by the tightening element 2.1.

During the tightening movement indicated in FIG. 4, the path covered by the ends 1*a*.1 and 1*b*.1 is again increased in comparison to the path covered by the tightening element 2.1.

By using a tension cable 2.2, the tensioner tube 2.3 can be aligned relatively freely to the linearly accelerated tightening element 2.1 and its linear tightening path. In addition, a tightening movement of two catch strap arrangements can be initiated with only one tightening element 2.1.

Figure 5:
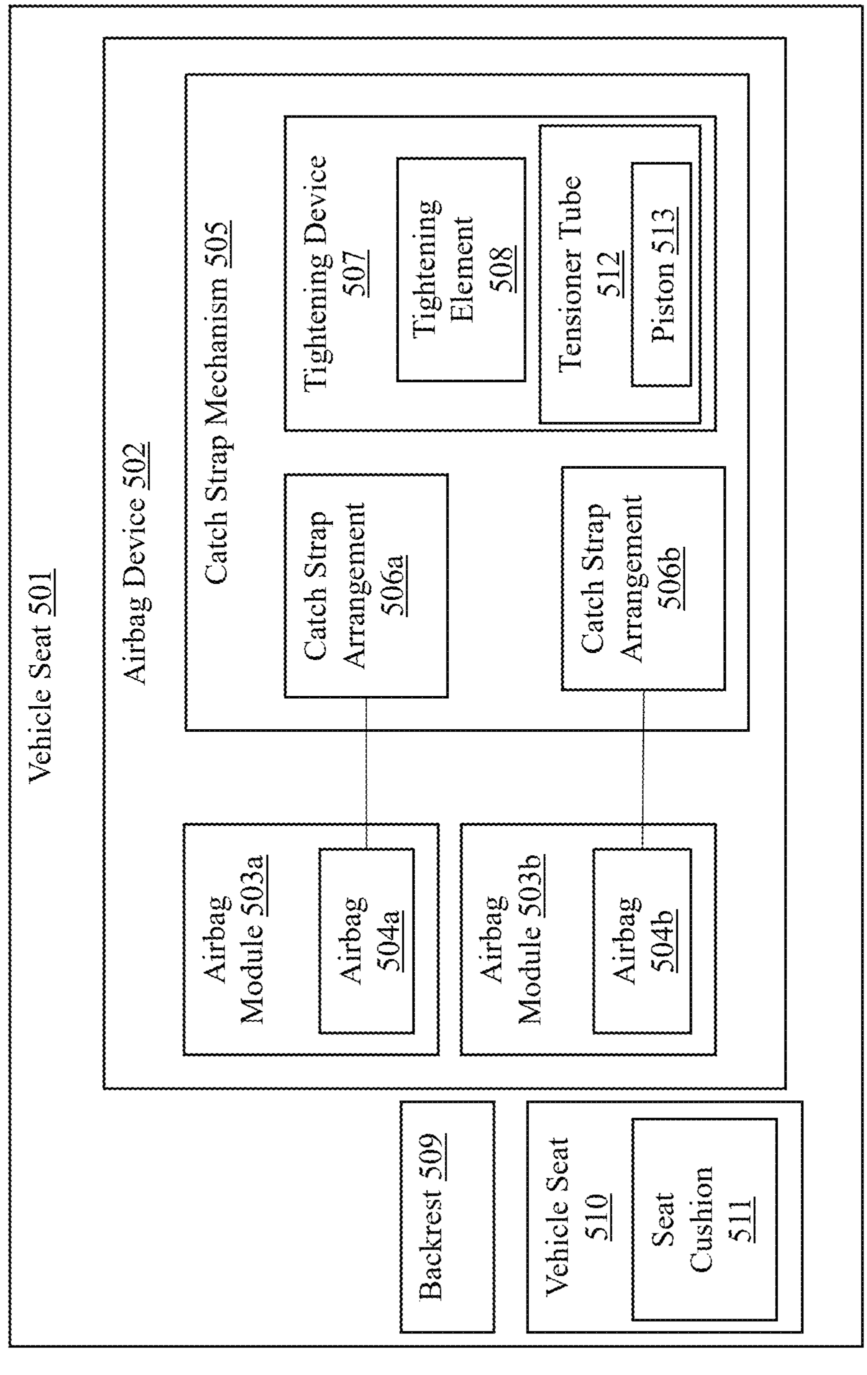
FIG. 5 illustrates a diagram of a vehicle seat, according to one embodiment of the present disclosure.

FIG. 5 illustrates a vehicle seat 5 for a motor vehicle, the vehicle seat 5 including a backrest 509 and a seat cushion 511, and an airbag device 502 including a catch strap mechanism 505, a first airbag module 503*a*, and a second airbag module 503*b*. The first airbag module 503*a* includes a first airbag 504*a* and the second airbag module 503*b* includes a second airbag 504*b*. The catch strap mechanism 505 includes a first catch strap arrangement 1*a*, an end of which is attached to the first airbag 504*a*, and a second catch strap arrangement 1*b*, an end of which is attached to the second airbag 504*b*. The catch strap mechanism 505 includes a tightening device 2 including a tightening element 2.1 which can be accelerated in a straight line, particularly pyrotechnically, wherein the tightening element 2.1 deflects both catch strap arrangements 1*a*, 1*b*. The tightening device 2 can include a tensioner tube 2.3 in which a piston 513 is arranged. The airbag modules 503*a*, 503*b* can be arranged on opposite sides of the backrest 509.

List of reference signs

- 1*a* First catch strap arrangement
- 1*b* Second catch strap arrangement
- 1*a*.1 First end of the first catch strap arrangement
- 1*b*.1 First end of the second catch strap arrangement
- 1*a*.2 Second end of the first catch strap arrangement
- 1*b*.2 Second end of the second catch strap arrangement
- 2 Tightening device
- 2.1 Tightening element
- 2.2 Tension cable
- 2.3 Tensioner tube
- 2.4 Deflection block
- 2.5 Receptacle
- 3 Deflector
- 4 Holder
- 5 Vehicle seat

The invention claimed is:

1. A catch strap mechanism for two airbag modules each having an airbag, the catch strap mechanism comprising:

two catch strap arrangements, wherein a first end of each of the two catch strap arrangements is attached to a respective airbag of the two airbag modules, and a tightening device for the two catch strap arrangements, wherein the tightening device comprises a tightening element which can be accelerated pyrotechnically in a straight line, wherein the tightening element deflects the two catch strap arrangements, wherein the two catch strap arrangements extend in laterally opposite directions from the tightening element toward the respective airbags before acceleration of the tightening element, and wherein the two catch strap arrangements extend in a same direction from the tightening element after acceleration of the tightening element.

2. The catch strap mechanism according to claim 1, wherein a second end of each of the two catch strap arrangements is fixed to the tightening element, wherein the two catch strap arrangements are guided around a deflector between the second ends and portions of the two catch strap arrangements deflected by the tightening element.

3. The catch strap mechanism according to claim 1, further comprising a holder with which second ends of the two catch strap arrangements can be fixed.

4. The catch strap mechanism according to claim 1, wherein the tightening device comprises a tension cable by means of which the tightening element can be driven.

5. The catch strap mechanism according to claim 4, wherein the tension cable is guided through a deflection block in which a receptacle for a gas generator is formed.

6. The catch strap mechanism according to claim 1, wherein the tightening device comprises a piston connected to a tension cable, wherein the piston is arranged in a tensioner tube and can be driven by compressed gas which can be generated by a gas generator.

7. An airbag device for a vehicle seat, comprising:

two airbag modules, wherein each airbag module comprises an airbag and is configured for attachment to the vehicle seat, and a catch strap mechanism comprising:

two catch strap arrangements, wherein a first end of each of the two catch strap arrangements is attached to a respective airbag of the two airbag modules, and a tightening device for the two catch strap arrangements comprising a tightening element which can be accelerated pyrotechnically in a straight line, wherein the tightening element deflects the two catch strap arrangements, wherein the two catch strap arrangements extend in laterally opposite directions from the tightening element toward the respective airbags before acceleration of the tightening element, and wherein the two catch strap arrangements extend in a same direction from the tightening element after acceleration of the tightening element.

8. The airbag device according to claim 7, wherein the two airbag modules are arranged on opposite sides of a backrest of the vehicle seat.

9. A vehicle seat for a motor vehicle, comprising:

a backrest;

a seat cushion; and a catch strap mechanism comprising:

two catch strap arrangements, wherein a first end of each of the two catch strap arrangements is attached to a respective airbag of two airbag modules, and a tightening device for the two catch strap arrangements comprising a tightening element which can be accelerated pyrotechnically in a straight line, wherein the tightening element deflects the two catch strap arrangements, wherein the two catch strap arrangements extend in laterally opposite directions from the tightening element toward the respective airbags before acceleration of the tightening element, and wherein the two catch strap arrangements extend in a same direction from the tightening element after acceleration of the tightening element.

* * * * *